United States Patent
Kang

(10) Patent No.: US 9,872,171 B2
(45) Date of Patent: Jan. 16, 2018

(54) SERVICE PROVISION METHOD USING WIRELESS FINGERPRINT MAP, DEVICE PERFORMING THE SAME, AND RECORDING MEDIUM RECORDING COMPUTER PROGRAM EXECUTING THE SAME

(71) Applicant: SK Planet Co., Ltd., Seongnam-si, Gyeonggi-do (KR)

(72) Inventor: Kichon Kang, Seoul (KR)

(73) Assignee: SK PLANET CO., LTD., Seongnam-si (KR)

( * ) Notice: Subject to any disclaimer, the term of this patent is extended or adjusted under 35 U.S.C. 154(b) by 0 days.

(21) Appl. No.: 15/292,125

(22) Filed: Oct. 13, 2016

(65) Prior Publication Data
US 2017/0188227 A1   Jun. 29, 2017

(30) Foreign Application Priority Data

Dec. 29, 2015  (KR) .......................... 10-2015-0188297

(51) Int. Cl.
| | |
|---|---|
| *H04M 3/00* | (2006.01) |
| *H04W 8/22* | (2009.01) |
| *H04L 29/08* | (2006.01) |
| *H04W 24/02* | (2009.01) |
| *H04W 4/00* | (2009.01) |
| *H04W 4/02* | (2009.01) |
| *H04W 64/00* | (2009.01) |
| *G06Q 30/02* | (2012.01) |
| *G01S 5/02* | (2010.01) |

(52) U.S. Cl.
CPC ............... *H04W 8/22* (2013.01); *H04L 67/16* (2013.01); *H04W 4/006* (2013.01); *H04W 4/02* (2013.01); *H04W 24/02* (2013.01); *H04W 64/00* (2013.01); *G01S 5/021* (2013.01); *G01S 5/0252* (2013.01); *G06Q 30/0261* (2013.01)

(58) Field of Classification Search
CPC ....... H04W 8/22; H04W 24/02; H04W 4/031; H04L 67/16; G01S 5/021; G01S 5/0252; G06Q 30/0261
See application file for complete search history.

(56) References Cited

U.S. PATENT DOCUMENTS

| | | | |
|---|---|---|---|
| 9,363,784 B1 * | 6/2016 | Friday ................. | H04W 64/003 |
| 2013/0260790 A1 * | 10/2013 | Itzhaki ................... | H04W 4/02 |
| | | | 455/456.1 |
| 2017/0103410 A1 * | 4/2017 | Kerr ................... | G06Q 30/0233 |

* cited by examiner

*Primary Examiner* — Barry Taylor
(74) *Attorney, Agent, or Firm* — Hauptman Ham, LLP

(57) ABSTRACT

The present invention relates to a service provision method for storing each wireless fingerprint characteristic of a case in which a service device provides a general service and a case in which the service device provides an event for each affiliated store in a wireless fingerprint map, and providing an event by changing a wireless signal transmission pattern through an affiliated store terminal, and a device performing the same and a recording medium recording a computer program executing the same.

10 Claims, 9 Drawing Sheets

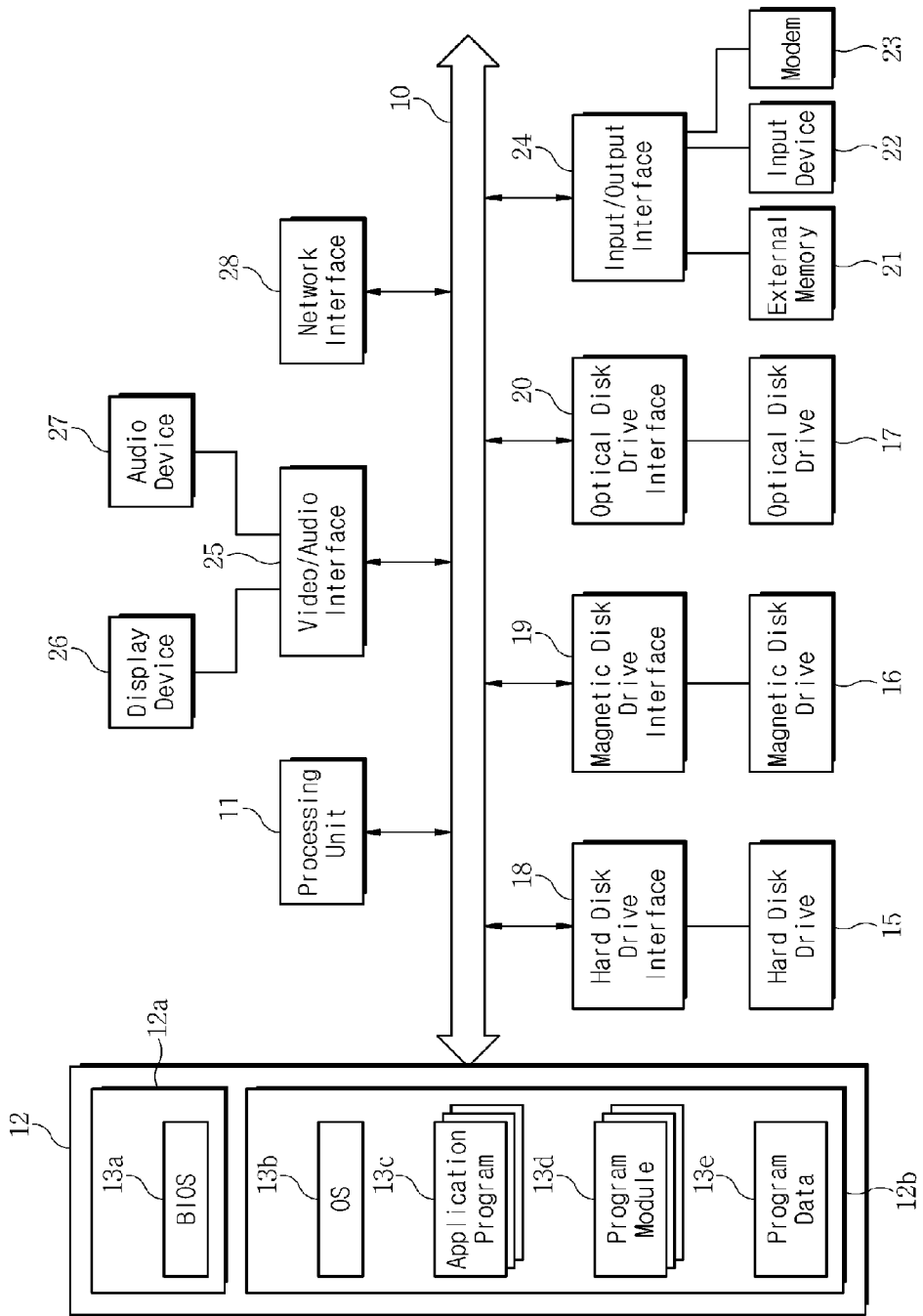

SERVICE PROVISION METHOD USING WIRELESS FINGERPRINT MAP, DEVICE PERFORMING THE SAME, AND RECORDING MEDIUM RECORDING COMPUTER PROGRAM EXECUTING THE SAME

CROSS-REFERENCE TO RELATED APPLICATION

This application claims priority to and the benefit of Korean Patent Application No. 10-2015-0188297 filed in the Korean Intellectual Property Office on Dec. 29, 2015 the entire contents of which are incorporated herein by reference.

TECHNICAL FIELD

The present invention relates to a service provision method using wireless fingerprint map, a device performing the same, and a recording medium recording a computer program executing the same, and more particularly, to a service provision method storing wireless fingerprint characteristics when a service device provides a general service to a wireless fingerprint map and when the service device provides an event for each affiliated store, and providing an event by changing a wireless signal transmission pattern through an affiliated store terminal, and a device performing the same and a recording medium recording a computer program executing the same.

BACKGROUND

Content described in this part merely provide background information related to embodiments of the present invention and do not configure a conventional art.

A mobile communication terminal has departed from the scope of a conventional simple communication device or an information provision device and has become an essential good of a modern person according to developments of a mobile communication network and a terminal specification, and is evolving as a total entertainment device.

Along with this, recently, a use of a smart phone in which a function of a communication terminal and a function of a personal digital assistant (PDA) are combined has become popularized. A smart phone is an intelligent terminal in which a computer support function such as Internet communication, information search, etc. is added to a mobile phone, a high capacity memory and a high performance central processing unit (CPU) are installed as compared with a conventional communication terminal, and an operating system (OS) for supporting various application executions, voice/data communication, PC connection, etc. is installed.

As one application technique using a smart phone, various location-based services providing convenience to a user (for example, vehicle navigation, a map, path finding, an indoor store guide, etc.) are being proposed and receiving much attention.

An important point in the location-based service is related to whether a position of a user can be precisely measured in some method.

Generally, a location tracking method using a global positioning system (GPS) is used for the location-based service used outdoors, but the GPS is not used indoors since it is difficult to communicate with a satellite indoors. Accordingly, positioning technology based on short range wireless communication technologies such as radio frequency identification (RFID), Bluetooth, and wireless-fidelity (Wi-Fi) are being mainly used indoors.

Cell-ID, triangular survey, fingerprint methods, etc. are examples of the positioning technology.

The Cell-ID method estimates a current position based on a nearest access point (AP) around a positioning target. This method can be simply implemented, but a positioning accuracy is poor. The triangular survey method basically provides a great position resolution, but generates a great position error due to a phenomenon such as multipath fading. Further, an implementation cost is increased in the method since a special device which can accurately measure information is required. Accordingly, the fingerprint method is preferred when compared with the two methods described above. The fingerprint method estimates a position by pre-selecting various arbitrary positions in a service region and using a received signal strength (RSS) collected from the selected positions.

The method has an advantage in that it alleviates an environmental factor through preliminarily information collection, but has disadvantages in that a time and a cost are required since a plurality of reference positions which are used for the positioning are required and the collection process is manually performed by a service manager.

Further, since the RSS is greatly changed according to an arrangement of an inside space, when a spatial arrangement is changed, the fingerprint has to be remeasured, and it is difficult to measure a precise position since there are various error factors.

In order to overcome the problems, various fingerprint map construction methods have been proposed, but a detailed method applying a constructed fingerprint map to marketing has not been proposed.

CITATION LIST

Patent Literature

Korean Patent Registration No. 10-0932271, Dec. 8, 2009 (Title: Method of Automatically Generating Fingerprint Database for Indoor Wireless Positioning)

SUMMARY

In order to solve the problems described above, the present invention is directed to providing a service provision method using a wireless fingerprint map which collects a variety of wireless environment information for constructing a wireless fingerprint map, and a device performing the same and a recording medium recording a computer program executing the same.

Further, the present invention is also directed to providing a service provision method using a wireless fingerprint map which collects a wireless fingerprint characteristic when providing a general service for each reference position and a wireless fingerprint characteristic when providing an event of a certain affiliated store, respectively, and provides marketing information such as prizes or discount events, etc. to a user by using the collected characteristics, and a device performing the same and a recording medium recording a computer program executing the same.

More particularly, the present invention is directed to providing a service provision method using a wireless fingerprint map in which a terminal positioned in each affiliated store which desires to generate an event changes a wireless fingerprint characteristic at a specific reference position by transmitting a wireless signal as a method for changing a fingerprint map, and a service device provides the event to a mobile communication terminal of a user by recognizing the generation of the event through the mobile communication terminal of the user measuring the change, and a device performing the same and a recording medium recording a computer program executing the same.

The technical objects which embodiments of the present invention desire to achieve are not limited to the objects described above, and other technical objects which are not mentioned will become more apparent to those of ordinary skill in the art by the following description.

One aspect of the present invention provides a service provision method using a wireless fingerprint map by a service device, including: collecting a general wireless fingerprint characteristic for each affiliated store and constructing a wireless fingerprint map; setting a wireless signal transmission pattern to be added and a kind of event to be generated when generating an event for each of the affiliated stores; collecting wireless environment information changed for each of the affiliated stores according to the wireless signal transmission pattern to be added when generating the event; and adding a wireless fingerprint characteristic for each event in the wireless fingerprint map based on the collected wireless environment information.

In more detail, the service provision method may further include: receiving wireless environment information scanned by a mobile communication terminal of a user from the mobile communication terminal of the user; comparing the wireless environment information received from the mobile communication terminal of the user and the wireless fingerprint characteristic of the wireless fingerprint map; and providing an event or a general service according to the comparison result.

Another aspect of the present invention provides a service device, including: a communication module configured to receive wireless environment information measured for each wireless signal transmission pattern corresponding to each event from a mobile communication terminal of a manager; a control module configured to collect a general wireless fingerprint characteristic for each affiliated store, construct a wireless fingerprint map, set a wireless signal transmission pattern to be added and a kind of event generated when generating an event for each affiliated of the stores, collect wireless environment information changed for each of the affiliated stores according to the wireless signal transmission pattern to be added when generating the event, and add a wireless fingerprint characteristic for each event to the wireless fingerprint map based on the collected wireless environment information; and a storage module configured to store the general wireless fingerprint characteristic and the wireless fingerprint characteristic for each of the events in the wireless fingerprint map.

In more detail, the communication module may receive wireless environment information scanned by a mobile communication terminal of a user from the mobile communication terminal of the user, and the control module may compare the wireless environment information received from the mobile communication terminal of the user and the wireless fingerprint characteristic of the wireless fingerprint map, and provide an event or a general service according to the comparison result.

Still another aspect of the present invention provides a computer readable recording medium in which a program executing the service provision method described above is recorded.

According to a service provision method using a wireless fingerprint map, as each wireless fingerprint characteristic of a case in which a general service is provided and a case in which an event is provided is collected in order to construct the wireless fingerprint map, a variety of marketing or service content may be provided.

Further, according to the present invention, as a wireless signal transmission pattern can be changed by an affiliated store terminal, an event may be generated when each affiliated store desires, and thus an effective marketing method providing service content may be provided.

That is, the present invention may collect the wireless fingerprint characteristic when providing the general service to wireless fingerprint map and wireless fingerprint characteristics corresponding to the number of events which each affiliated store owner desires to generate, change the wireless signal transmission pattern through the affiliated store terminal, and compare the wireless environment information measured by the mobile communication terminal of the user and a wireless fingerprint map in a service device, and provide the event corresponding to the comparison result.

Effects which can be obtained by the present invention are not limited the above-described effects, and those of ordinary skill in the art may understand that other effects which are not described can be obtained from the following description.

BRIEF DESCRIPTION OF DRAWINGS

FIG. 9 is a diagram showing an operating environment of a device for providing a service provision method using a wireless fingerprint map according to an embodiment of the present invention.

DETAILED DESCRIPTION

Figure 1:
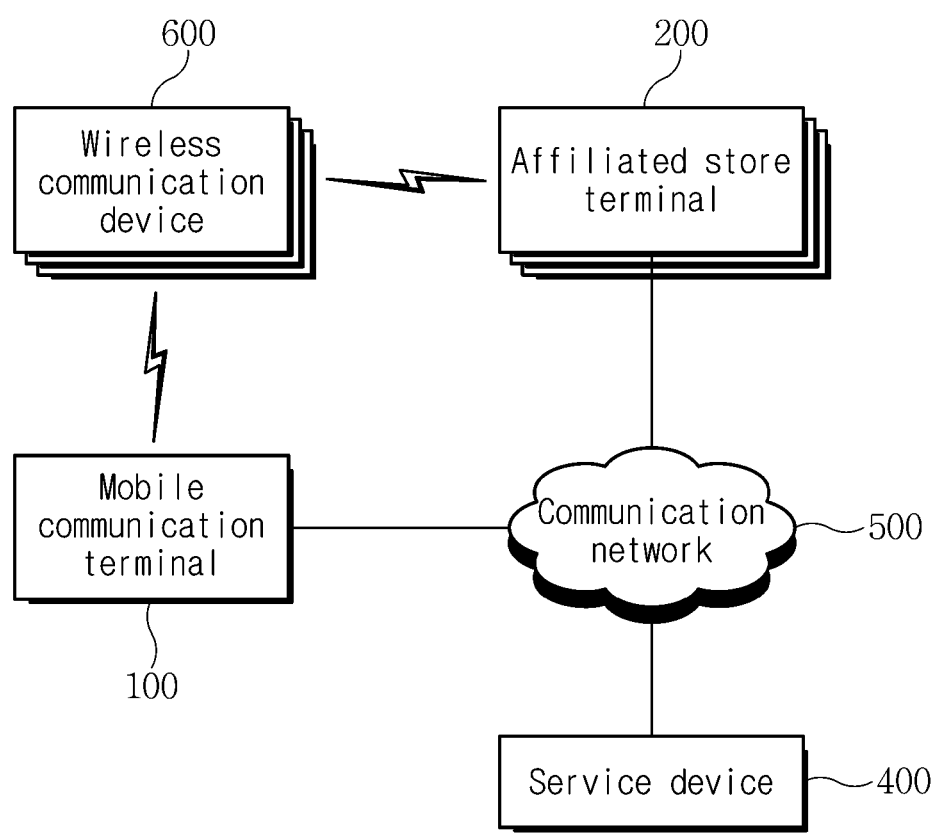
FIG. 1 is a schematic block diagram illustrating an entire system performing a service provision method using a wireless fingerprint map according to an embodiment of the present invention.

In order to more clearly understand the above and other objects, features and advantages of the present invention, the present invention will be described in detail with reference to embodiments shown in the accompanying drawings.

In the following description and the accompanying drawings, detailed descriptions of well-known functions or constructions that may obscure the point of the invention will be omitted. Further, through the accompanying drawings, it should be noted that the same reference numeral is used for the same component, if possible.

The terms used in the following description and the accompanying drawings are not to be construed as limited to general and dictionary meanings, but should be interpreted as meanings and concepts corresponding to the technical scope of the present invention on the basis of the principle that the inventor is allowed to define terms appropriately for the best explanation.

Therefore, since a configuration of the embodiments described and the drawings shown herein is just a preferable example and does not describe and show every technical scope of the invention, it should be understood that there could be various equivalents and modifications which can replace the embodiments in the present application point.

Further, although the terms first, second, etc. are used in order to describe various elements, the terms may be used herein in order to differentiate one element from another element, and the scope of the present invention is not to be construed as limited by these terms. For example, without departing from the scope of the present invention, a first element could be termed a second element, and similarly, a second element could be termed a first element.

In addition, when one element is described as being "connected" to or "in contact with" another element, this means that one element is logically or physically connected to or in contact with another element.

In other words, although one element is directly connected to or in contact with another element, it should be understood that there may be an intermediate element between the two elements, and one element may be indirectly connected to or in contact with another element.

Further, the terms used herein are merely used for describing embodiments of the invention, and are not intended to limit the scope of the invention. Unless otherwise clearly defined, the use of the singular form in the present document does not preclude the presence of more than one referent.

In addition, it should be further understood that the terms "comprises," "comprising," "includes," and/or "including," when used herein, specify the presence of stated features, numbers, steps, operations, elements, components and/or groups thereof, but do not preclude the presence or addition of one or more other features, numbers, steps, operations, elements, components, and/or groups thereof.

Further, the terms " . . . unit", " . . . device", "module", etc. used herein may refer to a unit of processing one or more functions or operations, and may be implemented by hardware, software, or a combination thereof.

Moreover, in the context describing the present invention (particularly, in the context of the claims below), unless otherwise clearly refuted, the articles "a," "an," "the", and analogous terms thereof are singular in that they have a single referent, however the use of the singular form in the present document does not preclude the presence of more than one referent.

Moreover, embodiments of the present invention may include a computer readable medium including or transmitting a computer executable command or a data structure stored in a computer readable medium. The computer readable medium may be an arbitrary available medium which is able to be accessed by a general-purpose or special-purpose computer system.

As an example, the computer readable medium may be a random access memory (RAM), a read-only memory (ROM), an erasable programmable ROM (EPROM), a compact disk-ROM (CD-ROM), an optical disk storage device, a magnetic disk storage device, or a magnetic storage device, may be used for storing or transmitting a predetermined program code means configured in the form of a computer executable command, a computer readable command, or a data structure, and may include a physical storage medium such as an arbitrary medium which can be accessed by a general-purpose or specific-purpose computer system, but is not limited thereto.

In the following description and claims, the term "network" may be defined as one or more data links which allow electronic data to be transmitted between computer systems and/or modules. When information is transmitted or provided to the computer system through the network or another communication connection (which is a wired or wireless connection or a combination of the wired and wireless connections), the connection may be understood as a computer readable medium.

For example, the computer readable command may include a command and data which allows a general-purpose computer system or a specific-purpose computer system to perform a specific function or a group of functions. For example, the computer executable command may be a binary or intermediate format command such as an assembly language, or even a source code.

Further, the present invention may be performed in a network computing environment having configurations of various forms of computer systems such as a personal computer (PC), a laptop computer, a handheld device, a multiprocessor system, microprocessor-based or programmable consumer electronics, a network PC, a mini computer, a mainframe computer, a mobile phone, a personal digital assistant (PDA), a pager, etc.

Further, the present invention may be executed in a distributed system environment in which all of local and remote computer systems linked by a wired data link, a wireless data link, or a combination of wired and wireless data links perform a task through the network. In the distributed system environment, a program module may be located in a local memory storage device and a remote memory storage device.

Hereinafter, a service provision method using a wireless fingerprint map, a device performing the same, and a recording medium recording a computer program executing the same will be described in detail with reference to the accompanying drawings.

First, a service provision system using a wireless fingerprint map according to an embodiment of the present invention will be described.

FIG. 1 is a schematic block diagram illustrating an entire system performing a service provision method using a wireless fingerprint map according to an embodiment of the present invention;

As shown in FIG. 1, the service provision system using a wireless fingerprint map according to an embodiment of the present invention may include a plurality of mobile communication terminals 100, an affiliated store terminal 200, a service device 400, a wireless communication device 600, and a communication network 500 connecting the plurality of mobile communication terminals 100, the affiliated store terminal 200, and the service device 400.

The service provision system using a wireless fingerprint map may be installed in a place in a specific range, for example, an entire region, some floors, etc. of a department or a discount mart, in an arbitrary range according to the need of a manager, or in a certain area range including a plurality of buildings. When considering a wireless fingerprint characteristic, it is more desirable to install the service provision system using a wireless fingerprint map indoors.

In the following description, a person receiving a customer service (position provision, payment, coupons, discount information, advertisement provision, etc. based on indoor position information) provided by the service device 200 configuring the present invention may be referred to as a user, and a person managing the service device 400 or the wireless communication device 600 for providing the customer service may be referred to as a manager.

Further, an affiliated store may refer to a store located in a specific indoor region in which the service provision system using a wireless fingerprint map according to an embodiment of the present invention is installed.

A general service is a service performed in a state which a change of a wireless signal transmission pattern for generating a specific event does not occur in the affiliated store, and is an indoor position information provision service.

The mobile communication terminal 100 is a device capable of transceiving various kinds of data by being connected to a wireless communication network provided by the present invention, and be used by a general user or the manager using the service.

Here, the term terminal may be substituted with terms such as user equipment (UE), mobile station (MS), mobile subscriber station (MSS), subscriber station (SS), advanced mobile station (AMS), wireless terminal (WT), machine-type communication (MTC) device, machine-to-machine (M2M) device, device-to-device (D2D) device, station (STA), etc. However, the terminal is not limited thereto, and when a device is connected to the wireless communication network provided by the present invention, the device may correspond to the mobile communication terminal 100 described herein. A unit which is on the same level as the units described above may be used as the mobile communication terminal 100 according to the present invention. The mobile communication terminal 100 may perform voice or data communication through the wireless communication network provided by the present invention, and for this, may include a browser for transceiving information, a memory for storing a program and a protocol and a microprocessor for executing, calculating and controlling various kinds of programs.

The mobile communication terminal 100 according to an embodiment of the present invention may be implemented in various forms. For example, the mobile communication terminal 100 described herein may be a mobile terminal to which mobile communication technology such as a smart phone, a tablet PC, a PDA, a portable multimedia player (PMP), a MP3 player, etc. is applied.

In detail, the mobile communication terminal 100 according to an embodiment of the present invention is a terminal capable of performing Bluetooth communication (for example, Bluetooth 4.0, that is, Bluetooth Low Energy, (referred to as BLE below)) and Wi-Fi connection, and performing a predetermined processing by receiving a signal from a device transmitting a beacon signal through BLE, or a beacon or AP device manufactured based on Wi-Fi. In addition, the mobile communication terminal 100 may perform a predetermined processing by performing bidirectional communication with the beacon device or wireless AP device in which various near field communication technologies using a personal area network (PAN) method such as Zigbee, Ultra-Wideband (UWB), ANT, Wi-Fi, and NFC, etc. are applied.

The mobile communication terminal 100 may be the mobile communication terminal 100 of a user which uses a positioning service provided by the service device 400 and various application services based on the positioning service, and may be the mobile communication terminal 100 of a manager which is used by the manager which provides a network, constructs a wireless fingerprint map in a predetermined range, and provides various kinds of services based on the constructed wireless fingerprint map.

The mobile communication terminal 100 of the manager may further include a module for the manager to construct the wireless fingerprint map and transceive information related to the construction of the wireless fingerprint map with the service device 100.

A detailed configuration of the mobile communication terminal 100 according to an embodiment of the present invention will be described in more detail below.

The affiliated store terminal 200 is a device generating a change of a wireless signal transmission pattern for generating an event according to an embodiment of the present invention. A device capable of changing a radio wave characteristic in a specific reference position by generating a wireless signal may become the affiliated store terminal 200 according to an embodiment of the present invention. Accordingly, the affiliated store terminal 200 according to an embodiment of the present invention is a kind of mobile communication terminal 100 described above, and may include a wireless signal transmission module and operate only when desiring to generate the event as a kind of wireless communication device 600 which will be described below.

The service device 400 is a kind of server device and an element for providing a service to a user through the network, may receive a service packet requested from the mobile communication terminal 100 and transmit a response packet to the mobile communication terminal 100 transmitting the service packet in response to the received service packet.

The service device 400 according to an embodiment of the present invention may be a web application server (WAS), an Internet information server (IIS), a web server, or cache server which is well-known on the Internet using Apache Tomcat or Nginx, and in addition, may be one of devices described as a device configuring a network computing environment.

Further, the service device 400 may support an operating system (OS) such as Linux or Windows, and execute a received control command. The service device 400 may include a program module implemented by software using languages such as C, C++, Java, Visual Basic, Visual C, etc.

In detail, the service device 400 according to an embodiment of the present invention may set a reference position in which a radio wave is measured for generating a wireless fingerprint map, set a time at which the radio wave is measured in the reference position, and transmit the position and the time at which the wireless environment information is measured to the mobile communication terminal 100 of the manager.

The wireless environment information is information representing a characteristic related to every radio wave capable of being detected in a specific position, and may include medial access control (MAC) address information, received signal strength intensity/indication (RSSI) information, round trip time (RTT) information, and identification information (service set identifier (SSID), basic service set identifier (BSSID), etc.) of the wireless communication device.

The MAC address may correspond to a kind of address assigned to the wireless communication device 600 for the communication, and MAC refers to media access control. The MAC address may exist in every device used in a network such as a local area network (LAN) card, a modem, a smart phone, etc., and is a serial number represented by a 12-digit hexadecimal number. The MAC address is unique to each device but may be changed according to a change of a component or changed through MAC spoofing.

The MAC address consists of 48-bits, a first 24-bits among the 48-bits may include an identification code of an organizationally unique identifier (OUI) manufacturer and information of a network interface controller (NIC) manufacturer, and the remaining 24-bits may include information of the LAN card.

The MAC address may be used in Ethernet, a 802.11 wireless network, Bluetooth, an Institute of Electrical and Electronics Engineers (IEEE) 802.5 token ring, an IEEE 802 network, a fiber distributed data interface (FDDI), an asynchronous transfer mode (ATM), a fiber channel, a serial small computer system interface (SCSI), an International Telegraph Union Telecommunication Standardization Sector (ITU-T) G.hn standard, etc.

Besides the MAC address, an extended unique identifier (EUI)-64 identifier may be used in a communication method such as FireWire, IPv6, Zigbee, 802.15.4, IPv6 over low power personal area networks (6LoWPAN), etc.

The RSSI information may be used by measuring a strength of a signal received from the wireless communication device 600 in the mobile communication terminal 100, and a loss between the mobile communication terminal 100 and the wireless communication device 600 may be associated with a distance over which the signal is moved. The RSSI information may be unstable according to an environment of the mobile communication terminal 100 performing an actual measurement.

In detail, the RSSI information is greatly influenced by directivity of an antenna of the wireless communication device 600, obstacles such as a wall, a pillar, furniture, a person, etc. located between a transmission side and a reception side, and materials configuring an interior structure, etc.

Radio wave time measurement information may be information for measuring a distance between two devices by measuring a propagation time of a transceived signal between the two devices, and a method of measuring a time-of-arrival (ToA) using a method similar to two-way ranging (TWR) technology defined in IEEE802.15.4a may be used for calculating the distance between the two devices.

There is a time-of-flight (TOF) method of calculating a distance by measuring a time taken when a signal is transmitted by synchronizing times of two devices, and a time difference of flight (TDOF) method of calculating a distance using a time difference taken when a signal is transmitted between two or more wireless communication devices 600 and the mobile communication device 100 in the method of measuring the radio wave time.

When the wireless communication device 600 is a BLE beacon device, the identification information of the wireless communication device 600 may be a unique value of the BLE beacon device including a universally unique identifier (UUID), a major/minor version, and a signal strength.

Generally, the identification information of the BLE beacon may consist of a 16-byte UUID, a 2-byte major, and a 2-byte minor. The UUID is an identifier standard used for constructing software, standardized as a portion of a distributed computing environment (DCE) by an open software foundation (OSF), and a unique identifier represented by 32 hexadecimal numbers.

When the wireless communication device 600 is a Wi-Fi beacon device, the identification information may consist of a unique value for each Wi-Fi including a BSSID, a frequency, and a signal strength. BSSID refers to a 48-bit identifier identifying a basic service set or a network ID in IEEE 802.11 which is a wireless LAN standard. Generally, BSSID refers to the MAC address of the AP device and is generated as an arbitrary value in case of an independent BSS or an Ad-hoc network.

When the wireless communication device 600 is a wireless AP device, the identification information of the AP device may be an IP address.

A detailed configuration of the service device 400 according to an embodiment of the present invention will be described in more detail below.

Further, the service device 400 according to the present invention may be connected to the mobile communication terminal 100 for performing the present invention through the communication network 500, and the communication network 500 refers to a network capable of transceiving data over an Internet protocol (IP) using various wired and wireless communication technologies such as the Internet, an intranet, a mobile communication network, a satellite communication network, etc.

Further, the communication network 500 may be connected to the service device 400 or the mobile communication terminal 100, and store a computing resource such as hardware, software, etc. The communication network 500 may not only include a concept of a closed network such as a LAN, a wide area network (WAN), etc. and an open network such as the Internet but also a network such as code division multiple access (CDMA), wideband code division multiple access (WCDMA), global system for mobile communications (GSM), long term evolution (LTE), evolved packet core (EPC), etc., and a next generation network and a computing network which may be implemented in the future.

Moreover, for example, the communication network 500 of the present invention may include a plurality of connection networks (not shown) and a core network (not shown), and include an external network, for example, the Internet (not shown).

Here, the connection network (not shown) is a connection network performing wired or wireless communication through the mobile communication terminal 100, and for example, may be implemented by a plurality of base stations (BSs) such as a BS, a base transceiver station (BTS), NodeB, eNodeB, etc., and a BS controller (BSC) such as a BSC, a radio network controller (RNC), etc.

In addition, as described above, a digital signal processing unit and a wireless signal processing unit which are integrally implemented in the BS may be classified into a digital unit (referred to as a DU below) and a wireless unit (referred to as an RU below), respectively, a plurality of RUs (not shown) may be installed in each of a plurality of regions, respectively, and the plurality of RUs (not shown) may be configured by being connected to a centralized DU (not shown).

Further, the core network (not shown) configuring a mobile network together with the connection network (not shown) performs a function of connecting the connection network (not shown) and the external network, for example, the Internet (not shown).

As described above, the core network (not shown) is a network system performing main functions for the mobile communication service of mobility control, switching, etc. between the connection networks (not shown), performs circuit switching or packet switching, and manages and controls a packet flow in the mobile network.

Further, the core network (not shown) may perform a function of managing mobility between frequencies, a function for a traffic in the connection network (not shown) and the core network (not shown) and for interwork with another network, for example, the Internet. The core network (not shown) may further include a serving gateway (SGW), a public data network (PDN) gateway (PGW), a mobile switching center (MSC), a home location register (HLR), a mobile mobility entity (MME), a home subscriber server (HSS), etc.

In addition, the Internet (not shown) refers to a generally well-known communication network in which information is exchanged according to a transmission control protocol (TCP)/IP protocol, that is, a common network, and may be connected to the server device 300, provide a service provided from the service device 400 to the mobile communication terminal 100 through the core network (not shown) and the connection network (not shown), and provide service request information transmitted from the mobile communication terminal 100 to the service device 400 through the connection network (not shown) and the core network (not shown).

The wireless communication device 600 according to an embodiment of the present invention may be located indoors where a service based on a wireless fingerprint map is provided, and perform a function of transmitting a wireless signal to one or more mobile communication terminals 100. In this case, the wireless communication device 600 may broadcast a wireless signal including a unique ID to the mobile communication terminal 100.

The wireless signal according to an embodiment of the present invention which the wireless communication device 600 broadcasts may be a signal which is periodically transmitted by the beacon device or a signal which is designed to be able to be transceived by the wireless AP device, and may include the identification information as described above.

The wireless communication device 600 may be one of a router, a repeater, a switch, and a bridge, and may be any device capable of implementing near field communication technology such as a wireless LAN, UWB, a radio frequency, infrared data association (IrDA), Zigbee, Bluetooth, etc.

A processor installed in each device according to an embodiment of the present invention may perform a program command for executing a method according to an embodiment of the present invention. In one implementation example, the processor may be a single-threaded processor, and in another implementation example, the processor may a multithreaded processor. Further, the processor may perform a command stored in a memory or a storage device.

The entire system performing the service provision method using a wireless fingerprint map according to an embodiment of the present invention is schematically described above.

Figure 2A:
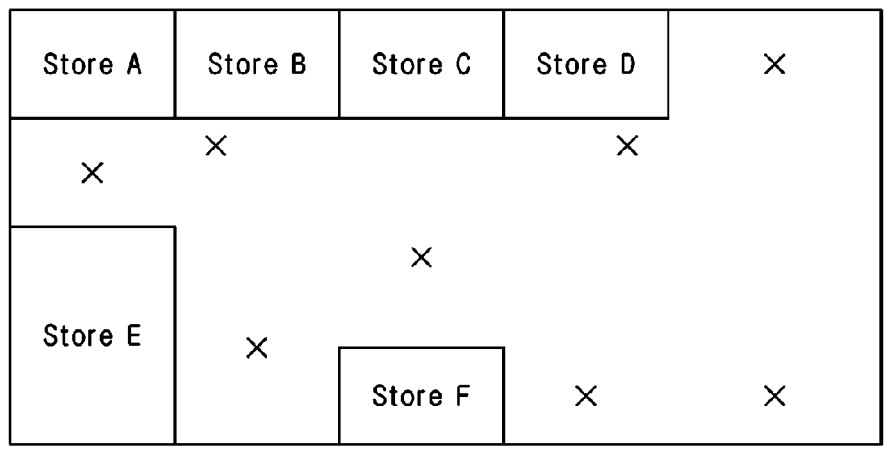
FIG. 2A and FIG. 2B are diagrams illustrating an example of constructing a wireless fingerprint map in order to perform a service provision method using a wireless fingerprint map according to an embodiment of the present invention.
Figure 2B:
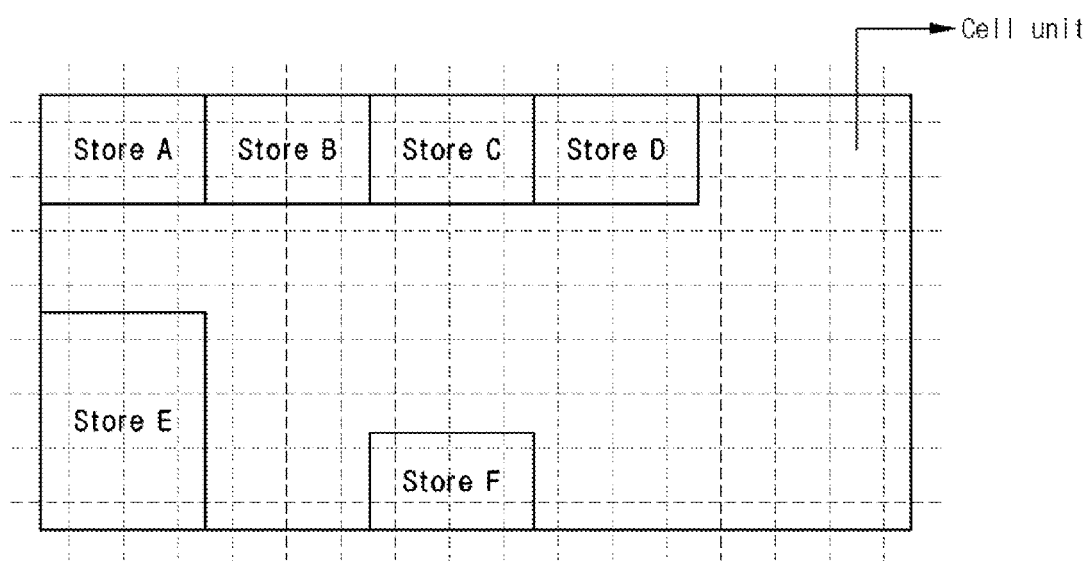

FIG. 2A and FIG. 2B are diagrams illustrating an example of performing a service provision method using a wireless fingerprint map according to an embodiment of the present invention;

FIG. 2A and FIG. 2B illustrate a specific indoor region in which a plurality of stores are centralized. When the specific indoor region is a shopping mall, there may be one or more wireless communication devices 600, such as a wireless AP for providing a wireless Internet itself or various kinds of services based on the wireless Internet to users using the corresponding shopping mall or a beacon device for providing a beacon service, etc., capable of broadcasting a wireless signal including their own unique IDs.

When there are a plurality of wireless communication devices 600, radio wave transmission periods or patterns of the wireless communication devices 600 may differ according to various factors such as a control of a server and a communication protocol of the wireless communication device 600.

That, when there are the plurality of wireless communication devices 600, all of the plurality of wireless communication devices 600 may not have the same radio wave transmission period, the period for each of the wireless communication devices 600 may be different (for example, when the wireless communication device 600 is the beacon device, a period of a first beacon device may be one second, a period of a second beacon device may be two seconds, a period of a third beacon device may be three seconds, etc.), and even when all of the plurality of wireless communication devices 600 have the same period, a time of the wireless signal to be transmitted may be different (for example, even when the beacon devices have the same period of three seconds, one beacon device may transmit the beacon signal at five minutes two seconds and five minutes five seconds, and another beacon device may transmit the beacon signal at five minutes one second and five minutes four seconds).

Wireless environment information measured in a specific position may be different according to arrangement of the wireless communication devices 600 and a structure in a store. In this condition, the service device 400 may designate a reference position at which it is determined that a wireless environment information measurement is required. X shown in FIG. 2B represents the reference position which is arbitrarily designated. Further, the service device 400 may set a wireless signal transmission pattern for generating an event for each affiliated store and a kind of event related to a corresponding pattern.

When the reference position is designated as shown in FIG. 2A, the mobile communication terminal 100 of the manager may collect wireless environment information in the corresponding position and transmit the collected information to the service device 400. In this case, according to an embodiment of the present invention, the mobile communication terminal 100 of the manager may collect the wireless environment information according to a wireless signal transmission pattern for a general service of a wireless signal in the corresponding reference position and wireless environment information according to the wireless signal transmission pattern for generating an event in each of the affiliated stores, and transmit the collected information to the service device 400.

A change of the wireless signal transmission pattern for generating the event may be performed as the affiliated store terminal 200 located in each of the affiliated stores transmits a specific wireless signal.

The service device 400 may receive the wireless environment information collected by the mobile communication terminal 100 of the manager and store each wireless fingerprint characteristic for providing the general service in the corresponding reference position and a wireless fingerprint characteristic for generating the event in a wireless fingerprint map using the collected wireless environment information.

As a method of setting a reference position for extracting and storing a wireless fingerprint characteristic, an indoor space may be divided in units of small cells as shown in FIG. 2B. In this case, the mobile communication terminal 100 of the manager may collect wireless environment information for each cell, and the service device 400 may store the wireless fingerprint characteristic for providing the general service for each cell and the wireless fingerprint characteristic for generating the event for each cell in the wireless fingerprint map.

Further, the mobile communication device 100 of the manager may transmit information related to a direction in which the mobile communication terminal 100 of the manager is headed using a geomagnetic sensor, etc. installed inside the mobile communication terminal 100 of the manager together with the wireless environment information to the service device 400. The wireless fingerprint map may be constructed by considering a direction in which a radio wave is measured and further considering the change of a radio wave environment according to a reception direction and the change of the wireless environment information by the manager, a user measuring the wireless environment information, or another obstacle, and accuracy may be increased when measuring the position and the change of the wireless signal transmission pattern according to the generation of the event.

Since data on which a spatial characteristic is reflected is collected, the accuracy may be increased compared with a triangular survey method, and the accuracy may be increased when measuring a position of the mobile communication terminal 100 as a wireless network environment is excellent and reference positions or cell units are more densely configured.

Through the operation described above, when the wireless fingerprint map related to a specific indoor space is constructed, the wireless fingerprint map may be used for measuring the position of the user and providing a marketing service.

The mobile communication terminal 100 of the user may collect wireless environment information and direction information at a corresponding position while the user is located in a store and transmit the collected information to the service device 400. The service device 400 may compare the wireless fingerprint characteristic for each reference position of the wireless fingerprint map, which is previously stored, based on the information received from the user and determine that the mobile communication terminal 100 of the corresponding user is located at a reference position having the greatest similarity.

Such information provision by positioning may correspond to a service which is generally performed even when the affiliated store terminal 200 is not operated. When the affiliated store terminal 200 operates in a specific affiliated store, the affiliated store terminal 200 may transmit a wireless signal and change a peripheral wireless environment, and the wireless environment information which the mobile communication terminal 100 of the user transmits to the service device 400 may have a similarity which a predetermined reference or more with a wireless fingerprint characteristic of a corresponding reference position on the wireless fingerprint map constructed for generating a specific event. Accordingly, the service device 400 may provide an event corresponding to the corresponding wireless fingerprint characteristic to the mobile communication terminal 100 of the user.

For example, the event may include various kinds of service content and a marketing means such as sale information provision during a specific time, coupon provision, gift coupon provision, etc.

Service provision using a wireless fingerprint map according to an embodiment of the present invention was described above with reference to FIG. 2A and FIG. 2B.

Hereinafter, the mobile communication terminal 100 which performs the service provision method using a wireless fingerprint map according to an embodiment of the present invention will be described with reference to FIGS. 3 to 5.

Figure 3:
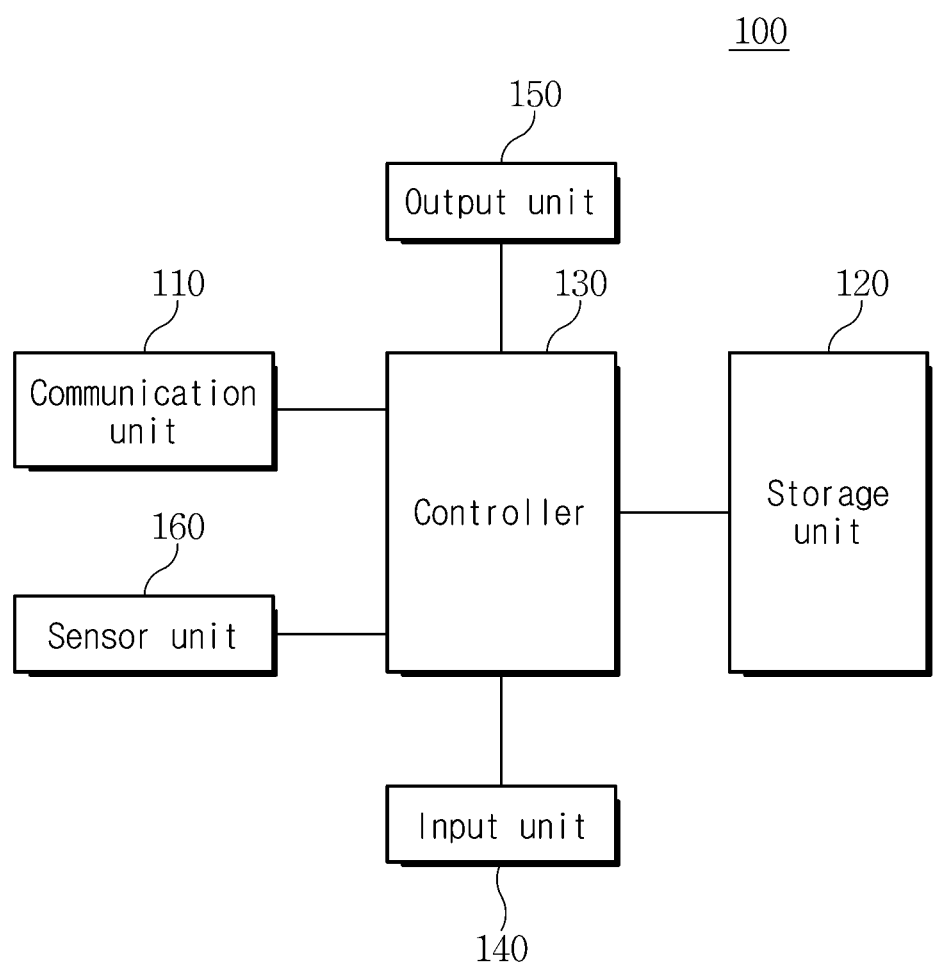
FIG. 3 is a schematic block diagram illustrating a mobile communication terminal which performs a service provision method using a wireless fingerprint map according to an embodiment of the present invention.

FIG. 3 is a schematic block diagram illustrating the mobile communication terminal 100 which performs a service provision method using a wireless fingerprint map according to an embodiment of the present invention.

Referring to FIG. 3, the mobile communication terminal 100 according to an embodiment of the present invention may include a communication unit 110, a storage unit 120, a controller 130, an input unit 140, an output unit 150, and a sensor unit 160.

The mobile communication terminal 100 of a manager and the mobile communication terminal 100 of a user are a kind of the mobile communication terminal 100, and basically have the same configuration as the mobile communication terminal 100.

The mobile communication terminal 100 of the manager may include a module or an application performing a transceiving operation of information for constructing a wireless fingerprint map. Accordingly, the application for constructing the fingerprint map may be driven by a manipulation or a command of the manager, display a reference position, and transmit wireless environment information and direction information to the service device 400.

The mobile communication terminal 100 of the user may install an application performing a location-based service and perform the location-based service. That is, the mobile communication terminal 100 of the user may drive the application for providing the location-based service by a manipulation or a command of the user, transmit wireless environment information and direction information collected when driving the application to the service device 400, and output a positioning result through the application for providing the location-based service.

Further, the mobile communication terminal 100 of the user may receive and output an event provided according to a wireless fingerprint characteristic recognized by the service device 400 according to an embodiment of the present invention.

The communication unit 110 is a means for receiving data from an external source and transmitting data to the external source, and for example, may be configured as a logical combination of one or more software and/or hardware modules such as a network interface card and a corresponding network driver interface specification (NDIS) stack.

The communication unit 110 may support various communication protocols. For example, the communication unit 110 may support various mobile communication standards such as advanced mobile phone system (AMPS), CDMA, GSM, W-CDMA, high speed sownlink access system (HSDPA), LTE, LTE Advanced (LTE-A), etc., and support near field wireless network technologies such as BLE and Zigbee.

In detail, in the present invention, the communication unit 110 may transceive data with the service device 400 through the communication network 500, and may include a mobile communication module for connecting to the communication network 500 and transceiving data according to a mobile communication standard. Wireless environment information and direction information according to a wireless signal transmission pattern set for each event collected by the mobile communication terminal 100 may be included in the transceived data, and position information and various kinds of service content based on the position information provided from the service device 400 may be included in the mobile communication terminal 100 of the user. Further, the mobile communication terminal 100 of the user may receive information related to the event provided by the service device 400 according to each wireless signal transmission pattern.

The storage unit 120 may be configured to store data or a program executed or processed by the controller 130. Basically, the storage unit 120 may store an OS for booting the mobile communication terminal 100 and operating each component described above, and an application program, etc. for supporting each of various user functions, for example, a user function for supporting a call function of the mobile communication terminal 100, an MP3 user function for playing a sound source, an image output function for outputting an image such as a photo, etc., and video playing function, etc.

In detail, in the present invention, the storage unit 120 may store an application or a computer program needed for an operation of performing the service provision method using a wireless fingerprint map according to the present invention.

The application or the computer program may be for constructing a fingerprint map in the mobile communication terminal 100 of the manager, and for receiving a location-based service using the constructed fingerprint map in the mobile communication terminal 100 of the user.

The storage unit 120 may include a magnetic medium such as a hard disk, a floppy disk, or a magnetic tape, an optical medium such as a compact disk read-only memory (CD-ROM) or a digital video disk (DVD), a magneto-optical medium such as a floptical disk, a ROM, a random access memory (RAM), and a flash memory.

The controller 130 may be configured to perform an overall control of the mobile communication terminal 100, and be implemented to include one or more processors. In one implementation example, the processor may be a single-threaded processor, and in another implementation example, the processor may be a multithreaded processor.

Further, the controller 130 may allow the one or more processors to process a command stored in the storage unit 120. In this case, for example, the command may include an interpreted command like a script command such as a JavaScript command, an ECMAScript command, etc., an executable code, or a command stored in a computer readable medium.

In detail, in the present invention, the controller 130 may control the communication unit 110 to transceive information with the service device 400 using an application stored in the storage unit 120. That is, the controller 130 may operate according to the application stored in the storage unit 120 or a service logic of the computer program, and perform the service provision method using a wireless fingerprint map according to the present invention.

The controller 130 of the mobile communication terminal 100 of the manager may receive information related to a reference position for collecting wireless environment information from the service device 400 through the communication unit 110, and display the information through the output unit 150. Further, the controller 130 of the mobile communication terminal 100 of the manager may collect the wireless environment information at the reference position according to a manipulation or a command of the manager, measure direction information when measuring the wireless environment information, and transmit the measured information to the service device 400.

The wireless environment information in the reference position may be information by a wireless signal transmission characteristic when any affiliated store terminal 200 is not operated, and may be information by the wireless signal transmission characteristic changed by a specific affiliated store terminal 200 for generating a specific event.

The controller 130 of the mobile communication terminal 100 of the user may be set to use a service provided by a manager of the service device 400 according to a manipulation or a command of the user. Accordingly, the controller 130 of the mobile communication terminal 100 of the user may measure wireless environment information and direction information and transmit the collected information to the service device 400. Further, the controller 130 of the mobile communication terminal 100 of the user may receive the service and content provided by the service device 400 based on the information transmitted by the mobile communication terminal 100 of the user, and display the received service and content through the output unit 150.

The input unit 140 may be configured to receive the command and information from the user, generate a predetermined user input signal according to the manipulation of the user, and transmit the generated signal to the controller 130.

The input unit 140 may be implemented as various input means which are currently being used or may be used in the future, and for example, not only include a general input device such as a keyboard, a mouse, a joystick, a touch screen, a touch pad, etc. bu also a gesture input means generating a specific input signal by sensing a motion of the user and a voice recognition means recognizing a voice of the user.

Further, the input unit 140 may be connected to the controller 130 through a system bus and an input and output interface.

Here, for example, the input and output interface may logically represent any one among various different interfaces such as a serial port interface, a personal system/2 (PS/2) interface, a parallel port interface, a universal serial bus (USB) interface, and an IEEE 1394 interface (that is, a FireWire interface), or logically represent a combination of other interfaces.

The output unit 150 may be configured to allow the user to recognize an operating result or a state of the mobile communication terminal 100, and particularly, may visually output information using a display means.

For example, the output unit 150 may not only be implemented by various two-dimensional display means such as an electro luminescence display (ELD), a vacuum fluorescent display (VFD), a liquid crystal display (LCD), a light emitting diode (LED) display, a plasma display panel (PDP), an organic LED (OLED) display, etc. but also a three-dimensional display means such as a hologram or a laser beam.

The output unit 150 may be connected to the controller 130 through a video interface such as a high definition multimedia interface (HDMI) a graphics device interface (GDI), etc. and connection between the controller 130 and the video interface may be performed through the system bus.

In detail, in the present invention, the output unit 150 may be used for displaying information received from the service device 400.

The sensor unit 160 may be configured to sense motion of the user and measure a movement distance and a movement direction, and may include a GPS for recognizing a current position using a satellite, a geomagnetic sensor for sensing a direction such as east, west, south, and north, an acceleration sensor and a tilt sensor for sensing a movement speed and the number of steps of the user, and a gyro sensor.

In detail, the sensor unit 160 according to the present invention may recognize the current direction of the mobile communication terminal 100.

Figure 4:
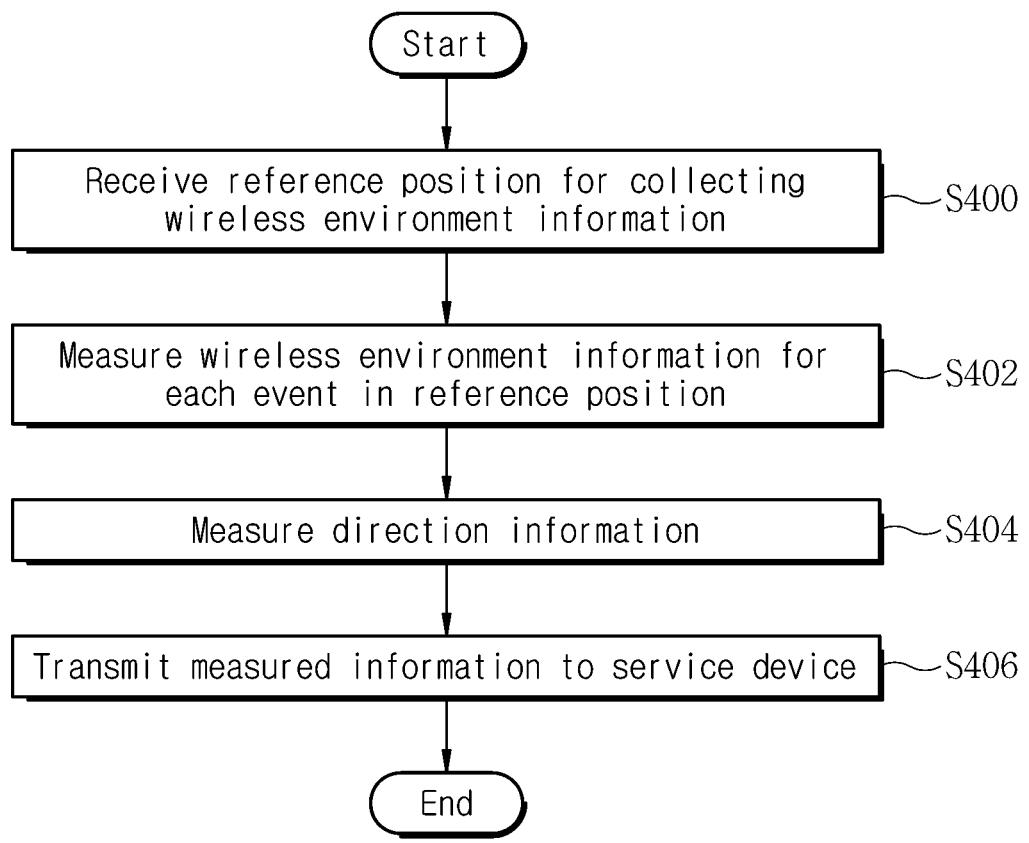
FIG. 4 is a flowchart showing an operation of a mobile communication terminal of a manager which performs a service provision method using a wireless fingerprint map according to an embodiment of the present invention.

FIG. 4 is a flowchart showing an operation of the mobile communication terminal 100 of a manager among the mobile communication terminals 100.

Referring to FIG. 4, the mobile communication terminal 100 of the manager may receive a reference position for collecting wireless environment information from the service device 400 (S400). The manager may measure the wireless environment information at the reference position displayed in the mobile communication terminal 100 of the manager (S402), and at the same time, may measure direction information of the mobile communication terminal 100 of the manager measuring the wireless environment information (S404). After this, the mobile communication terminal 100 of the manager may transmit the collected information to the service device 400 (S406).

As described above, the mobile communication terminal 100 of the manager may measure the wireless environment information when an event for each reference position is not generated and the wireless environment information changed according to an operation of the affiliated store terminal 200, and transmit the measured wireless environment information.

Figure 5:
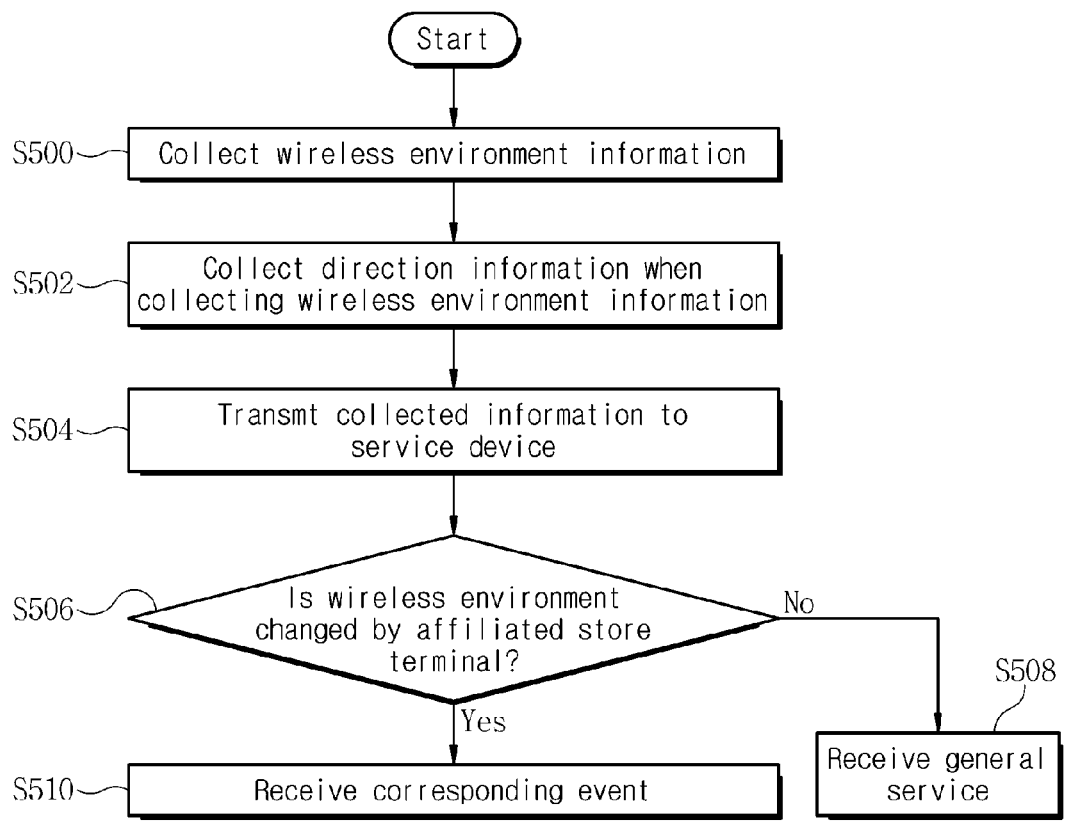
FIG. 5 is a flowchart showing an operation of a mobile communication terminal of a user which performs a service provision method using a wireless fingerprint map according to an embodiment of the present invention.

Further, FIG. 5 is a flowchart showing an operation of a mobile communication terminal 100 of a user among the mobile communication devices 100.

Referring to FIG. 5, the mobile communication terminal 100 of the user may first collect wireless environment information in a current position of the mobile communication terminal 100 of the user when set to use a service provided by a manager of the service device 400 according to a manipulation or command of the user (S500). At the same time, the mobile communication terminal 100 of the user may collect direction information when measuring the wireless environment information (S502), and transmit the collected information to the service device 400 (S504). After this, an affiliated store terminal may transmit a wireless signal for generating an event, receive a general service from the service device 400 when the wireless environment information transmitted by the mobile communication terminal 100 of the user is similar to a wireless fingerprint characteristic of a general service state on a wireless fingerprint map (S508) according to whether a wireless environment is changed (S506), and receive a service or content according to a corresponding event when the wireless environment information transmitted by the mobile communication terminal 100 is similar to the wireless fingerprint characteristic when generating an event provided by a specific affiliated store (S510). The operation may be performed while the mobile communication terminal 100 of the user is moving.

The mobile communication terminal 100 according to an embodiment of the present invention was described above.

Hereinafter, an affiliated store terminal performing the service provision method using a wireless fingerprint map according to an embodiment of the present invention will be described.

Figure 6:
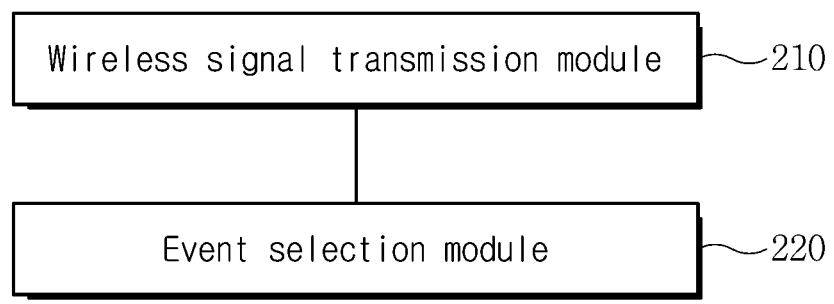
FIG. 6 is a schematic block diagram illustrating an affiliated store terminal performing a service provision method using a wireless fingerprint map according to an embodiment of the present invention.

FIG. 6 is a schematic block diagram illustrating the affiliated store terminal 200 which performs the service provision method using a wireless fingerprint map according to an embodiment of the present invention.

Referring to FIG. 6, the affiliated store terminal 200 according to an embodiment of the present invention may include a wireless signal transmission module 210, and an event selection module 220.

Here, the term "module" is an element performing a predetermined function, and may be implemented by hardware, software, or a combination thereof. For example, "module" may refer to a program module and include elements such as software elements, object-oriented elements, class elements, and task elements, which perform a predetermined function by being executed by the processor, processors, functions, attributes, procedures, subroutines, segments of a program code, drivers, data, a database, data structures, tables, arrays, and variables. Further, the functions provided in the elements and the modules may be combined by a smaller number of elements and modules or be further divided into additional elements and modules.

The wireless signal transmission module 210 may be configured to transmit a radio wave for generating an event by the affiliated store terminal 200, and transmit a radio wave having a different pattern according to an event selected by the event selection module 220. This means that one affiliated store terminal 200 may generate various kinds of events.

The event selection module 220 may perform a function of the controller for allowing an owner of each affiliated store to generate a desired event through the affiliated store terminal 200. When selecting an event which the owner of the affiliated desires to generate through the event selection module 220, the event selection module 200 may control the wireless signal transmission module 210 and transmit a wireless signal corresponding to the corresponding event.

The two modules may be located in one device, but may be separated from each other with the event selection module 220 being located inside the affiliated store and the wireless signal transmission module 210 being located at a position at which marketing is desired to be provided to a user in the affiliated store.

Further, although not shown, as described above, since the affiliated store terminal 200 may be a kind of mobile communication terminal 100, the affiliated store terminal 200 may include a configuration of the mobile communication terminal. Alternatively, since the affiliated store terminal 200 is a kind of mobile communication terminal, the affiliated store terminal 200 may be a device including the modules described above in the configuration of the wireless communication device 600.

Hereinafter, the service device 400 which performs the service provision method using a wireless fingerprint map according to an embodiment of the present invention will be described.

Figure 7:
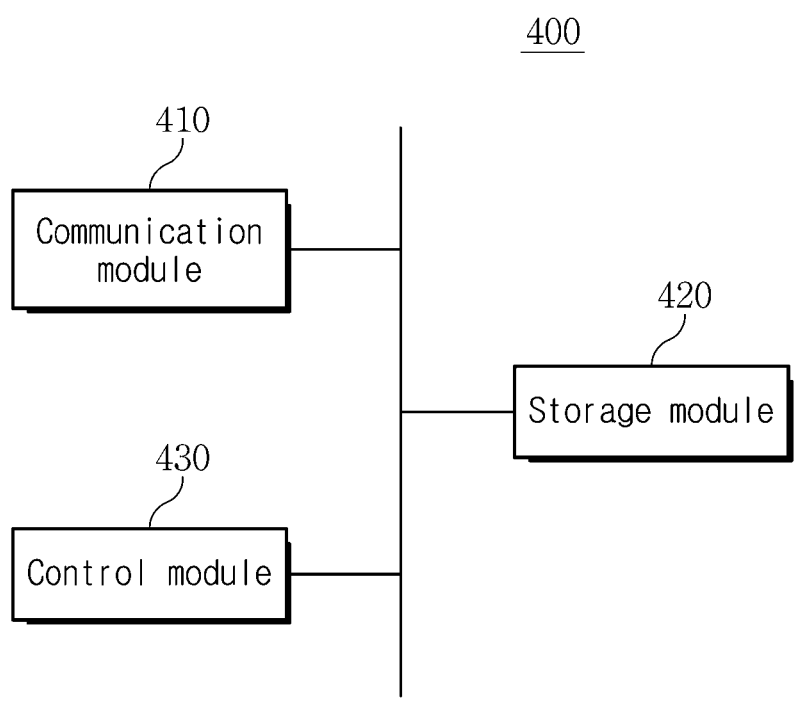
FIG. 7 is a schematic block diagram illustrating a service device performing a service provision method using a wireless fingerprint map according to an embodiment of the present invention.

FIG. 7 is a block diagram illustrating a configuration of the service device 400 performing the service provision method using a wireless fingerprint map according to an embodiment of the present invention.

Referring to FIG. 7, the service device 400 according to an embodiment of the present invention may include a communication module 410, a storage module 420, and a control module 430.

Among them, the communication module 410 may is a means for receiving data from an external source and transmitting data to the external source, and may perform communication by connecting to the mobile communication terminal 100 through the communication network 500. Accordingly, the communication module 410 may receive wireless environment information and direction information from the mobile communication terminal 100 and transmit a measured position to the mobile communication terminal 100 of a user, and perform a function of supporting a transceiving operation of information with the mobile communication terminal 100 such as an operation of transmitting content related to a location-based service to the mobile communication terminal 100 when a manager provides the location-based service.

In detail, the communication module 410 according to an embodiment of the present invention may receive wireless environment information by a radio wave transmitted by the wireless communication device 600 installed indoors and wireless environment information formed by adding a radio wave transmitted by each affiliated store terminal 200 set for generating an event to the radio wave of the wireless communication device 600 which is previously transmitted.

Further, the communication module 410 may transmit event information to the mobile communication terminal 100 by an operation of the affiliated store terminal 200.

The storage module 420 may store a program performing the service provision method using a wireless fingerprint map according to an embodiment of the present invention. The storage module 420 may store the wireless environment information and the direction information collected from the mobile communication terminal 100.

Further, the storage module 420 may store a wireless fingerprint map, and a wireless fingerprint characteristic for each reference position extracted from the wireless environment information may be stored in the wireless fingerprint map. The wireless fingerprint characteristic may be stored by being divided into a case in which one or more affiliated store terminals 200 for providing an event are operated and a case in which one or more affiliated store terminals 200 are not operated.

The control module 430 may be configured to control the service device 400 to perform the service provision method using a wireless fingerprint map, and may be implemented by the support of one or more processors. In one implementation example, the processor may be a single-threaded processor, and in another implementation example, the processor may be a multithreaded processor.

Further, the control module 430 may be operated by processing a command stored in the storage module 420 through the one or more processors. In this case, for example, the command may be an interpreted command like a script command such as JavaScript, ECMAScript, etc., an executable code, or a command stored in a computer readable medium.

In detail, the control module 430 according to an embodiment of the present invention may construct the wireless fingerprint map based on wireless environment information for each reference position received from the mobile communication terminal 100 of the manager in a specific indoor space for constructing the wireless fingerprint map. Wireless fingerprint characteristics having the number of events capable of being generated in one reference position may be stored in the wireless fingerprint map by classifying wireless fingerprint characteristics generated as a result of wireless environment information collection for each reference position into a case in which an event is provided and a case in which the event is not provided.

The reference position may be a position set by classifying the specific indoor space in units of cells. In this case, the collection of the wireless environment information and the storage of the wireless fingerprint characteristic may be performed for each cell.

Further, direction information of a measurement time of the mobile communication terminal 100 of the manager measuring the wireless environment information for each reference position may be further stored in the wireless fingerprint map.

The control module 430 may use the constructed wireless fingerprint map in order to measure the position of the mobile communication terminal 100 of the user. When the mobile communication terminal 100 of the user uses a positioning service, the communication module 410 may receive wireless environment information and direction information from the mobile communication terminal 100 of the user, and the control module 430 may compare the wireless fingerprint characteristic for each reference position stored in the constructed wireless fingerprint map based on the received information, generate the position information by recognizing a reference position having a most similar periodic pattern as the position of the mobile communication terminal 100 of the current user, and transmit the position information to the mobile communication terminal 100 of the user.

Further, the control module 430 may provide an event corresponding to a corresponding wireless fingerprint characteristic when the wireless environment information received from the mobile communication terminal 100 of the user is similar to the wireless fingerprint characteristic for generating an event set for each reference position stored in the wireless fingerprint map.

Figure 8:
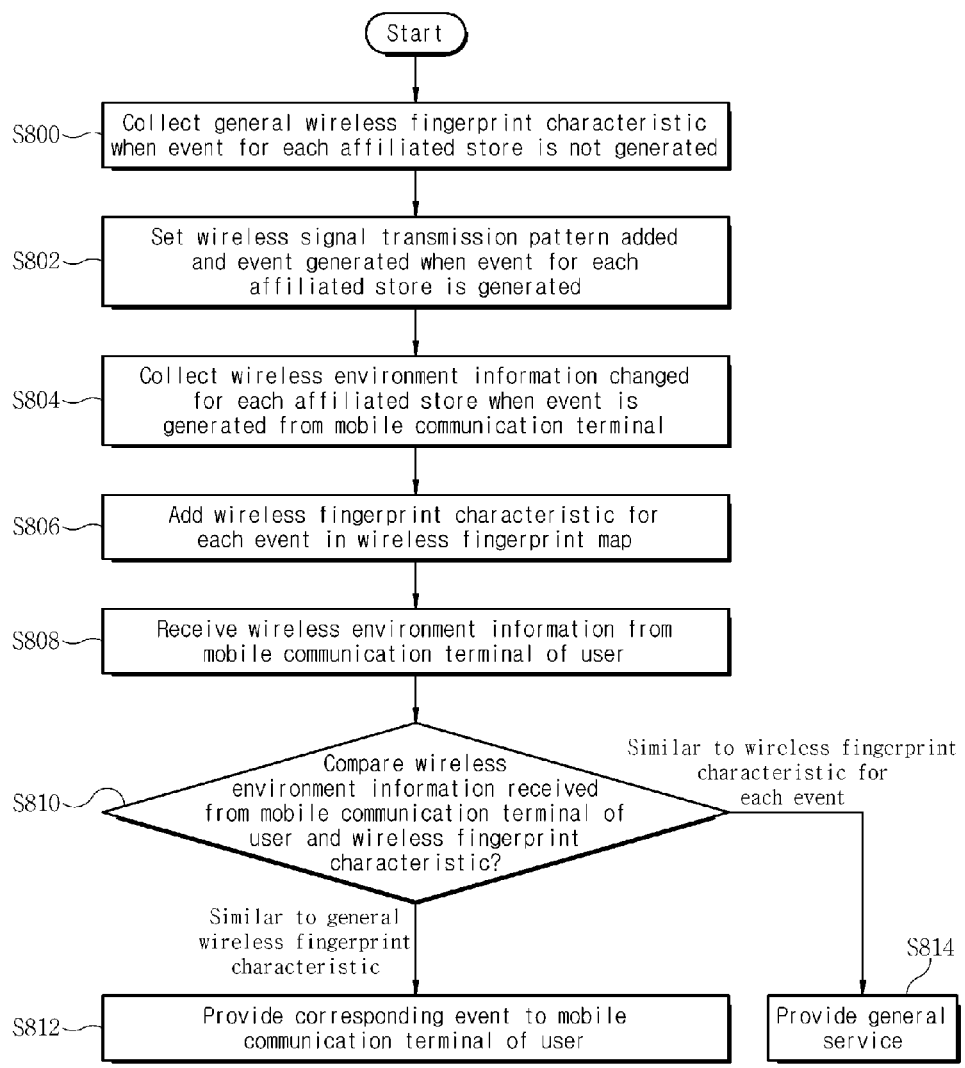
FIG. 8 is a flowchart showing an operation of a service device performing a service provision method using a wireless fingerprint map according to an embodiment of the present invention.

FIG. 8 is a flowchart showing an operation of the service device 400.

Referring to FIG. 8, first, the service device 400 may receive wireless environment information changed during a predetermined time at a specific reference position in a specific indoor space from the mobile communication terminal 100 of a manager in order to generate a wireless fingerprint map when an event is not generated for each affiliated store.

The service device 400 may collect a wireless fingerprint characteristic related to the specific reference position based on the received wireless environment information, and construct a wireless fingerprint map (S800).

The service device 400 may receive direction information measured together when measuring the wireless environment information of the mobile communication terminal 100 of the manager in a process of performing the operation.

Further, the service device 400 may set a wireless signal transmission pattern added and a kind of event generated when generating an event for each affiliated store (S802).

When the affiliated store terminal 200 transmits a wireless signal according to the set transmission pattern and the event, the service device 400 may collect wireless environment information by the wireless signal transmission pattern changed for each affiliated store according to the event generation for each affiliated store from the mobile communication terminal 100 of the manager (S804).

After this, the service device 400 may store a wireless fingerprint characteristic for each event in the wireless fingerprint map based on the collected wireless environment information (S806).

When reference positions are densely configured, a fingerprint map having much more accuracy may be constructed. Further, the reference position may be set as a position at which a characteristic of a radio wave transmitted by the affiliated store terminal 200 is well shown, or the affiliated store terminal 200 may be installed by considering the reference position at which a user desires to receive marketing in the affiliated store.

After this, the service device 400 may receive wireless environment information scanned by a mobile communication terminal from the mobile communication terminal 100 of a user (S808), compare the wireless environment information received from the mobile communication terminal of the user and the wireless fingerprint characteristic of the wireless fingerprint map (S810), provide a corresponding event when a similarity between the wireless environment information received from the mobile communication terminal and the wireless fingerprint characteristic for each event of the specific affiliated store is a predetermined reference or more (S812), and provide a general service such as a positioning service when the similarity between the wireless environment information received from the mobile communication terminal and a general wireless fingerprint characteristic of the specific affiliated store is the predetermined reference or more (S814).

Above, the operation of the service device 400 according to an embodiment of the present invention is described with reference to the flowchart.

The present invention may include the program performing the service provision method using a wireless fingerprint map, and in this case, the program recorded in the recording medium may perform the function described above by being read, installed, and executed in a computer.

Here, in order for the computer to read the program recorded in the recording medium and execute the functions implemented by the program, the program described above may include codes coded in a computer language such as C, C++, Java, a machine language, etc. which can be read by a central processing unit (CPU) of the computer through a device interface of the computer.

That is, the codes described above may include every language such as a data-oriented language such as a structured query language (SQL), dBase, etc., a system language such as C, objective C, C++, an assembly language, etc., an architecture language such as Java, NET, etc., and an application language such as PHP, Ruby, Perl, Python, etc., but is not limited thereto, and may include every language which is well known to those of ordinary skill in the art.

The codes may include functional codes related to a function defining the functions described above, and include control codes related to an execution procedure needed for executing the functions described above by the processor of the computer according to a predetermined procedure.

Further, the codes may further include a memory reference related code regarding whether additional information or media needed for executing the functions described above by the processor of the computer should be referenced in any position (address) of internal or external memories of the computer.

Moreover, when the processor of the computer needs to communicate with any other computer, server, etc. which is located in a remote place in order to execute the functions described above, the code may further include a communication related code regarding how the processor of the computer should communicate with any other computer, server, etc. which is located in the remote place using a communication module of the computer, and what information or medium should be transceived when communicating.

The computer readable medium suitable for storing a computer program command and data, for example, the recording medium may include a magnetic medium such as a hard disk, a floppy disk, or a magnetic tape, an optical medium such as a CD-ROM, or a DVD, a magneto-optical medium such as a floptical disk, or a semiconductor memory such as a ROM, a RAM, a flash memory, an EPROM, or an EEPROM. The processor and the memory may be supplemented by a specific-purpose circuit, or be integrated into the specific-purpose circuit.

The computer readable recording medium may be distributed to a computer system connected by a network, and a computer readable code may be stored and executed in a distributed method.

Further, a functional program for implementing the present invention, a code and a segment related to the program may be easily inferred or changed by programmers of ordinary skill in the art by considering a system environment of a computer which reads the recording medium and executes the program.

Each operation according to an embodiment of the present invention may be implemented as the computer executable command, and be executed by a computing system. Here, the term "computing system" may be defined as one or more software modules, one or more hardware modules, or a combination thereof operating together with an operation on electronic data For example, the computer system may include a software module such as an OS of a PC and a hardware component of a PC. A physical layout of the module is not important. The computer system may include one or more computers which are connected through a network.

Similarly, the computing system may be implemented by one physical device in which an internal module such as a memory and a processor operate together with the operation on the electronic data.

For example, an implementation executing the technical feature described herein may include a back-end component such as a data server, or, for example, may include a middle-ware component such as an application server.

For example, an implementation executing the technical feature described herein may be implemented in an operation system including a front-end component such as a client computer having a web browser or a graphic user interface in which a user interworks with an implementation of the subject of the present invention described herein, or a combination of one or more back-end, middle-ware or front-end components. For example, the components of the system may be interconnected by any form or medium of digital data communication such as a communication network.

That is, a device for performing the service provision method using a wireless fingerprint map according to the present invention may be implemented to perform the embodiments described above based on a computing system which will be described below.

FIG. 9 is a diagram illustrating an operating environment of a device for providing the service provision method using a wireless fingerprint map according to an embodiment of the present invention. That is, FIG. 9 is a diagram for describing an operating environment of the mobile communication terminal 100 or the service device 400.

FIG. 9 and the following description provide a simple and general description of a suitable computing environment in which the present invention can be implemented. Although not required, the present invention may be described in relation with a computer executable command such as a program module which is executed by a computer system.

Generally, the program module may include a routine, a program, an object, a component, a data structure, etc. performing specific task or implementing a specific abstract data type. The computer executable command, the related data structure, and the program module may be an example of a program code means executing an operation of the invention disclosed herein.

Referring to FIG. 9, an exemplary computing system implementing the present invention may include a computing device configured to include a processing unit 11, a system memory 12, and a system bus 10 connecting various system components including the system memory 12 to the processing unit 11.

The processing unit 11 may execute a computer executable command designed to implement features of the present invention.

The system bus 10 may be a local bus, a peripheral bus, and a memory bus using any one among various bus architectures, or any one among several types of bus structures including a memory controller.

The system memory 12 may include a ROM 12a and a RAM 12b. A basic input and output system (BIOS) 13a including a basic routine helping to transmit information between components in the computing system while the computer system boots up may generally be stored in the ROM 12a.

The computing system may include a storage means, and for example, a hard disk drive 15 reading information from a hard disk or recording information in the hard disk, a magnetic disk drive 16 reading information from a magnetic disk or recording information in the magnetic disk, an optical disk drive 17 reading information from an optical disk such as a CD-ROM or an optical medium, etc., or recording information in the optical disk.

The hard disk drive 15, the magnetic disk drive 16, and the optical disk drive 17 may be connected to the system bus 10 by a hard disk drive interface 18, a magnetic disk drive interface 19, and an optical drive interface 20, respectively.

Further, the computing system may further include an external memory 21 as a storage means. The external memory 21 may be connected to the system bus 10 through an input and output interface 24.

The drives described above and the related computer readable medium which is read and recorded by the drives may provide a nonvolatile storage of the computer executable command, a data structure, a program module, and data.

An exemplary environment described herein may include the hard disk drive 15, the magnetic disk drive 16, and the optical disk drive 17, but in addition, other types of computer readable media storing data, including a magnetic cassette, a flash memory card, a DVD, a Bernoulli cartridge, a RAM, a ROM, etc. may be used.

A program code means including an OS 13b, one or more application programs 13c, an alternate program module 13d, and one or more program modules including the program data 13c, which are loaded and executed by the processing unit 11 may be stored in the hard disk drive 15, the magnetic disk drive 16, the optical disk drive 17, the ROM 12a, or the RAM 12b.

Further, the computing system may receive a command and information from a user through an input device 22 such as a keyboard, a pointing device, a microphone, a joystick, a game pad, a scanner, etc. The input device 22 may be connected to the processing unit 11 through the input and output interface 24 connected to the system bus 10.

For example, the input and output interface 24 may logically represent any one among various different interfaces such as a serial port interface, a PS/2 interface, a parallel port interface, a USB interface, and an IEEE 1394 interface (that is, a FireWire interface), or logically represent a combination of other interfaces.

Further, the computing system to which the present invention is applied may further include a display device 26 such as a monitor or an LCD and an audio device 27 such as a speaker or a microphone, and be connected to the system bus 10 through a video/audio interface 25.

For example, a peripheral output device such as a speaker, a printer (not shown), etc. may be connected to the computer system. The video/audio interface unit 25 may include an HDMI, a GDI, etc.

Further, for example, the computing system performing the present invention may be connected to a network such as an office-wide or business-wide computer network, a home network, an intranet, and/or the Internet. For example, the computer system may exchange data with external sources such as a remote computer system, a remote application, and/or a remote database through the network.

For this, the computing system to which the present invention is applied may include a network interface 27 receiving data from an external source and/or transmitting data to the external source.

In the present invention, the computing system may transceive information with a device which is located in a remote place through the network interface 27. For example, when the computing system is the mobile communication terminal 100, the computing system may transceive information with the service device 400 through the network interface 27.

Alternatively, when the computing system is the service device 400, the computing system may transceive information with the mobile communication terminal 100 through the network interface 27. For example, the network interface 27 may be represented by a logical combination of one or more software and/or hardware modules such as a network interface card and a corresponding NDIS stack.

Similarly, the computer system may receive data from the external source or transmit data to the external source through the input and output interface 24. The input and output interface 24 may be connected to a modem 23 (for example, a standard modem, a cable modem, or a digital subscriber line (DSL) modem), and receive data from the external source and/or transmit data to the external through the modem 23.

FIG. 9 illustrates an operating environment suitable for the present invention, but a principle of the present invention may be applied to any system capable of implementing the principle of the present invention by a suitable modification if necessary. The environment shown in FIG. 9 is merely an example and may not represent even a small portion of various environments in which the principle of the present invention can be implemented.

Further, a variety of information generated when executing the service provision program using a wireless fingerprint map according the present invention may be stored in and accessed from an arbitrary computer readable medium related to the computing system shown in FIG. 9.

For example, a portion of the program modules and a portion of the related program data may be included in the OS 13*b*, the application program 13*c*, the program module 13*d*, and/or program data 13*e*, in order to be stored in the system memory 12.

Further, when a mass storage device such as the hard disk is connected to the computing system, the program module and the related program data may be stored in the mass storage device.

In a network environment, the program module related to the present invention or a portion thereof may be stored in a remote computer system which is connected through the modem 23 of the input and output interface 24 or the network interface 25, for example, a system memory related to the computing system of the service device 400 and/or a remote memory storage device such as a mass storage device. The module may be performed in the distributed environment described above.

As described above, this specification may include details of a plurality of specific implementations, but it should be understood as not limiting any invention or the scope which can be claimed, and it should be understood as a description related to features of a specific embodiment of a specific invention. Specific features described herein in the context of an individual embodiment may be implemented by being combined in a single embodiment.

Alternatively, in the context of the single embodiment, various features may also be implemented in a plurality of embodiments individually or by a combination of any suitable lower levels. Further, the features may be operated in a specific combination and initially described as being claimed, but one or more features may be excluded from the claimed combination in some cases, and the claimed combination may be changed into a lower combination or modifications of the lower combination.

Similarly, the operations are illustrated in a specific order in the drawings, but it should be understood that is not necessary for the operations to be performed according to the specific order or the sequential order shown in order to obtain a desirable result, or that every operation must be performed. In some cases, multitasking and parallel processing are preferable.

Further, it should be understood that separation of various system components of the embodiments described above is not required in every embodiment, and it should be understood that the program components and the systems described above may generally be integrated into a single software product or packaged in a multiple software product.

The description described herein provides the best mode of the present invention, and provides an example in order to describe the present invention and allow those of ordinary skill in the art to manufacture and use the present invention. This specification does not limit the present invention by the detailed terms proposed herein.

Accordingly, although the invention is described in detail with reference to the example described above, it should be understood that other equivalents, modifications, and changes could be made thereto without departing from the spirit and scope of the invention by those of ordinary skill in the art.

Accordingly, the scope of the present invention is not defined by the embodiments described above, and should be defined by the appended claims.

What is claimed is:

1. A service provision method using a wireless fingerprint map by a service device, comprising:
    collecting a wireless fingerprint characteristic for a service at a reference position corresponding to an affiliated store and constructing a wireless fingerprint map by mapping the wireless fingerprint characteristic to the affiliated store;
    setting an event to be provided by the affiliated store and a wireless signal transmission pattern for generating an event wireless fingerprint characteristic different from the wireless fingerprint characteristic corresponding to the event;
    collecting the event wireless fingerprint characteristic for the event at the reference position, which the event wireless fingerprint characteristic is changed according to the wireless signal transmission pattern;
    adding the event wireless fingerprint characteristic to the wireless fingerprint map to be mapped to the affiliated store;
    receiving, from a mobile communication terminal, wireless environment information scanned by the mobile communication terminal;
    comparing the received wireless environment information and wireless fingerprint characteristics of the wireless fingerprint map; and
    providing the event or the service according to the comparison result.

2. The service provision method of claim 1, wherein the wireless environment information includes one or more among media access control (MAC) address information, received signal strength intensity/indication (RSSI) information, round trip time (RTT) information, and identification information of a wireless communication device.

3. The service provision method of claim 1, wherein the providing of the event or the service comprises:
    when a similarity between the wireless environment information received from the mobile communication terminal and the event wireless fingerprint characteristic for the event of the affiliated store is a predetermined reference or more, providing the event to the mobile communication terminal.

4. The service provision method of claim 1, wherein the providing of the event or the service comprises:
    when a similarity between the wireless environment information received from the mobile communication terminal and the wireless fingerprint characteristic of the affiliated store is a predetermined reference or more, providing the service to the mobile communication terminal.

5. A non-transitory computer-readable recording medium storing a program for causing a service device to execute a service provision method for a wireless fingerprint map, the method comprising:
    collecting a wireless fingerprint characteristic for a service at a reference position corresponding to an affiliated store and constructing a wireless fingerprint map by mapping the wireless fingerprint characteristic to the affiliated store;
    setting an event to be provided by the affiliated store and a wireless signal transmission pattern for generating an event wireless fingerprint characteristic different from the wireless fingerprint characteristic corresponding to the event for the affiliated store;
    collecting the event wireless fingerprint characteristic for the event at the reference position, which the event wireless fingerprint characteristic is changed according to the wireless signal transmission pattern;
    adding the event wireless fingerprint characteristic to the wireless fingerprint map to be mapped to the affiliated store;

receiving a wireless environment information scanned by a mobile communication terminal of a user from the mobile communication terminal;

comparing the wireless environment information received from the mobile communication terminal and wireless fingerprint characteristics of the wireless fingerprint map; and providing the event or the service according to the comparison result.

6. The non-transitory computer-readable recording medium of claim 5, wherein the providing of the event or the service comprises:

when a similarity between the wireless environment information received from the mobile communication terminal and the event wireless fingerprint characteristic for the event of the affiliated store is a predetermined reference or more, providing the event to the mobile communication terminal.

7. The non-transitory computer-readable recording medium of claim 5, wherein the providing of the event or the service comprises:

when a similarity between the wireless environment information received from the mobile communication terminal and the wireless fingerprint characteristic of the affiliated store is a predetermined reference or more, providing the service set in the affiliated store to the mobile communication terminal.

8. A service device, comprising:

a communication module configured to receive wireless environment information measured by a mobile communication terminal from the mobile communication terminal;

a storage module configured to store a wireless fingerprint map in which a general wireless fingerprint characteristic for a service and an event wireless fingerprint characteristic for an event are mapped to each affiliated store; and a control module configured to collect the wireless fingerprint characteristic at a reference position corresponding to each affiliated store, construct the wireless fingerprint map by mapping the wireless fingerprint characteristic to the affiliated store, set the event to be provided by each affiliated store and a wireless signal transmission pattern for generating the event wireless fingerprint characteristic corresponding to the event different from the wireless fingerprint characteristic, collect the event wireless fingerprint characteristic at the reference position, which the event wireless fingerprint characteristic is changed according to the wireless signal transmission pattern, add the event wireless fingerprint characteristic to the wireless fingerprint map to be mapped to the affiliated store, when the wireless environment information is received form the mobile communication terminal, compare the received wireless environment information and wireless fingerprint characteristics of the wireless fingerprint map, and providing the event or the service according to the comparison result.

9. The service device of claim 8, wherein, when a similarity between the received wireless environment information and the event wireless fingerprint characteristic for the affiliated store is a predetermined reference or more, the control module provides the event to the mobile communication terminal.

10. The service device of claim 8, wherein, when a similarity between the received wireless environment information and the wireless fingerprint characteristic of the affiliated store is a predetermined reference or more, the control module provides the service set in the affiliated store to the mobile communication terminal.

* * * * *